USO12151905B2

United States Patent
Forthuber et al.

(10) Patent No.: US 12,151,905 B2
(45) Date of Patent: Nov. 26, 2024

(54) ELECTROMAGNETIC TRANSPORT SYSTEM

(71) Applicant: B&R INDUSTRIAL AUTOMATION GMBH, Eggelsberg (AT)

(72) Inventors: Friedrich Forthuber, Eggelsberg (AT); Philipp Rogner, Eggelsberg (AT); Christian Kastinger, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 113 days.

(21) Appl. No.: 18/025,086

(22) PCT Filed: Sep. 22, 2021

(86) PCT No.: PCT/EP2021/076104
§ 371 (c)(1),
(2) Date: Mar. 7, 2023

(87) PCT Pub. No.: WO2022/063848
PCT Pub. Date: Mar. 31, 2022

(65) Prior Publication Data
US 2023/0322506 A1 Oct. 12, 2023

(30) Foreign Application Priority Data
Sep. 22, 2020 (AT) .............................. A 50803/2020

(51) Int. Cl.
*H02K 41/00* (2006.01)
*B65G 54/02* (2006.01)
(Continued)

(52) U.S. Cl.
CPC ............ *B65G 54/02* (2013.01); *H02P 25/064* (2016.02); *B65G 2203/0283* (2013.01); *B65G 2203/0291* (2013.01)

(58) Field of Classification Search
CPC ............................. H02P 25/064; B65G 54/02
(Continued)

(56) References Cited

U.S. PATENT DOCUMENTS

| 10,587,212 B1 | 3/2020 | Van Dorpe et al. |
| 11,366,446 B2 | 6/2022 | Hessenauer et al. |

(Continued)

FOREIGN PATENT DOCUMENTS

EP   3 024 128   5/2016

OTHER PUBLICATIONS

Austria Search Report conducted in counterpart Austria Appln. No. A 50803/2020 (Sep. 1, 2021).
(Continued)

*Primary Examiner* — Erick D Glass
(74) *Attorney, Agent, or Firm* — GREENBLUM & BERNSTEIN, P.L.C.

(57) ABSTRACT

In an electromagnetic transport system, a transport route is divided into transport sections, each including at least one transport segment. A section control unit is assigned to each transport section, and a segment controller is assigned to each transport segment. A logistics unit, specifies a destination of the transport units to section control units via the logistics network. Section control units are connected to segment controllers of associated transport segments via a segment network and are designed to: determine a track section for the associated transport section from the destination, determine target values using the track section and transmit the target values to the segment controllers via the segment network. Segment controllers supply current to drive coils using target values and occurring actual values to generate a magnetic field which interacts with drive magnets of the transport units to move the transport units.

16 Claims, 3 Drawing Sheets

(51) Int. Cl.
    *H02P 1/00*           (2006.01)
    *H02P 3/00*           (2006.01)
    *H02P 5/00*           (2016.01)
    *H02P 25/064*      (2016.01)

(58) Field of Classification Search
    USPC .......................................................... 318/135
    See application file for complete search history.

(56)                  References Cited

U.S. PATENT DOCUMENTS

| | | |
|---|---|---|
| 2015/0344233 A1 | 12/2015 | Kleinikkink et al. |
| 2019/0084781 A1 | 3/2019 | Huang et al. |
| 2021/0167713 A1* | 6/2021 | Kaufleitner ........... B60L 3/0007 |
| 2021/0402881 A1* | 12/2021 | Hanis ..................... B60L 13/03 |

OTHER PUBLICATIONS

Int'l Search Report (Form PCT/ISA/210) conducted in Int'l Appln. No. PCT/EP2021/076104 (Jan. 4, 2022).
Int'l Written Opinion (Form PCT/ISA/237) conducted in Int'l Appln. No. PCT/EP2021/076104 (Jan. 4, 2022).
Int'l Prelim. Exam. Report (Form PCT/IPEA/409) conducted in Int'l Appln. No. PCT/EP2021/076104 (Oct. 5, 2022).

* cited by examiner

ELECTROMAGNETIC TRANSPORT SYSTEM

The present invention relates to an electromagnetic transport system comprising a number of transport units which are arranged movably along a transport route, wherein drive coils are arranged along the transport route and drive magnets are arranged on the transport units, wherein the transport route is divided into transport sections, the transport sections each comprising at least one transport segment, wherein a section control unit is assigned to each of the transport sections and a segment controller is assigned to each transport segment. Furthermore, the present invention relates to a method for controlling the movement of a number of transport units which are arranged movably along a transport route of an electromagnetic transport system, wherein the transport route is divided into transport sections and the transport sections each comprise at least one transport segment.

Transport routes of an electromagnetic transport system, such as a long stator linear motor or planar motor, can be divided into a plurality of sections, as disclosed for example by EP 3 024 128 A1 with respect to a long stator linear motor. The sections are divided into sub-sections, wherein a converter is provided per sub-section. Furthermore, a control unit is assigned to each of the sections, which control the converters of the assigned sub-sections in order to supply current to the respective sub-sections. In the case of a transfer of a transport unit between sections, it is proposed in EP 3 024 128 A1 that the control unit, in whose section the transport unit is located, is to be defined as a master and the control unit, which is located in the direction of movement, is to be defined as slave. The master plans the track of the transport unit for its own sub-section and the sub-section of the slave. For this purpose, the master controls the slave via a real-time capable interface. It is further proposed to provide a superordinate control unit as a master, which plans the track of the transport unit and controls the subordinate control units as slaves via a further interface.

It is an object of the present invention to specify an electromagnetic transport system which can be expanded in a simple manner.

This object is achieved according to the invention by providing a logistics unit which is connected to the section control units via a logistics network and is designed to specify a destination of the number of transport units to the section control units via the logistics network, wherein the section control units of the transport sections are connected to the segment controllers of the associated transport segments via a segment network and are designed to determine a track section for the associated transport section from the destination, to determine the target values using the track section and to transmit said target values to the segment controllers via the segment network, wherein the segment controllers are designed to supply current to the drive coils using the target values and occurring actual values, to generate a magnetic field which interacts with the drive magnets of the transport units in order to move the number of transport units. Furthermore, the object is achieved by a method, wherein the section control units associated with the transport sections are each associated a destination for the number of transport units by a logistics unit via a logistics network, wherein the section control units for the number of transport units determine a track section from each of the associated destinations, determine target values using the track sections, transmit said target values of associated segments to segment controllers via a segment network, and wherein the segment controllers supply current to the drive coils of the transport segment using the target values and known actual values in order to generate a magnetic field which interacts with drive magnets of the transport units in order to move the number of transport units.

Thus, transport routes of any length can be divided into transport sections, wherein one section control unit is provided per transport section. Therefore, there is no planning of the entire track of the transport unit at a central location and also no planning of track sections of two adjacent transport sections on one unit, but rather planning of a track section per transport section. Thus, the track of the transport unit can be divided into small track sections, which are calculated by the respective section control units. This means that they each have to use less computing power than in the case of centralized track planning or master-slave track planning. According to the invention, long stator linear motors with long transport routes (and thus long routes and, accordingly, long tracks, which are divided into track sections) can also be constructed in a simple and cost-effective manner. The track describes the general route from the current location of the transport unit to the destination. A track section describes the general route from the current location to the transfer position—if the destination is outside the transport section. However, when planning the path, no values for position, speed, acceleration, no further physical effects such as masses, forces, etc. are taken into account.

The target values, on the other hand, describe the kinetics of the transport unit along the track and can thus, for example, comprise the intended target position, target speed, target acceleration and take into account further physical effects. The time profile of the movement of the transport unit thus results from the time profile of the target values (and the corresponding regulation of the actual values). When determining the target values, specified limit values (maximum values) can also be taken into account.

Furthermore, due to the modular design, it is possible to extend the transport route in a simple manner through further transport sections and associated section control units. The superordinate logistics unit specifies the destination of the number of transport units to the section control units via a logistics network. The destination may also depend on an operating parameter of the transport unit in question, so that the destination may vary, for example, depending on the operating parameters. Further process steps to be carried out by the transport unit can also be specified by the logistics unit.

The destination of a transport unit is not to be confused with the track of a transport unit, since the track does not only describe the destination, but rather the route of the transport unit. If the destination can be reached via different transport sections, the logistics unit can specify, in addition to the destination, which of the transport sections are to be passed through but without describing the track itself. In addition to the destination, the logistics unit thus also describes milestones, so to speak, in the form of transport sections to be passed through.

If a branching is provided in a transport section, the associated section control unit can also decide (if this is not specified by the logistics unit) which branching is to be used. If several parallel paths in the direction of the destination are possible within a transport section, the section control unit can also decide which path is to be used.

Preferably, sensors are provided on the transport segments in order to detect the actual values. The actual values on the segments are thus measured and made available to the segment controller.

Preferably, the actual values comprise actual currents and/or actual forces that occur on the transport segment. Particularly preferably, the actual values comprise actual positions and/or actual speeds and/or actual accelerations of the transport unit in question. Preferably, the target values comprise target currents and/or target forces for the transport segment and/or target positions and/or target speeds and/or target accelerations for the transport unit in question.

Advantageously, the section control units are connected to one another via a section network and are designed to transmit data, preferably actual values, via the section network. For example, if it is intended to transfer a transport unit from a first transport section to another, adjacent, second transport section, the section control units of the first transport section can transmit data to the section control unit of the second transport section in order to enable an improved transfer and transfer of the transport unit.

Segment controllers can transmit actual values to the section control units) via the segment network and the section control units can transmit actual values via a section network. The section control units thus obtain knowledge of actual values outside of their transport section and can, for example, prepare for arriving transport units and their receipt.

In addition, the cycle time of the individual networks can be reduced by dividing them into several networks, which further reduces the network load and allows faster processes to be implemented.

The section network can be designed as a real-time network or point-to-point network and preferably have an adjustable cycle time. The section network can also be designed as a different type of analog or digital interface.

The segment network can be designed as a real-time network or point-to-point network and preferably have an adjustable cycle time. The segment network can also be designed as a different type of analog or digital interface.

Preferably, the logistics network is designed as a non-real time-capable network, preferably as an Ethernet network. Since the specification of the destination, in contrast to the planning of the track sections, does not require high computing power, the logistics network does not require as high a performance as required for the section network and/or segment network Adjacent transport segments can be designed to overlap, which creates redundancy and also enables an optimized transfer of transport units.

The transport sections can each be embodied two-dimensionally and/or one-dimensionally. In particular, the electromagnetic transport system can be embodied as a long stator linear motor, as a planar motor or as a combination of long stator linear motor and planar motor, for example by a part of the transport sections being embodied as a long stator linear motor and another part of the transport sections being embodied as a planar motor.

The track sections of adjacent transport sections can have a continuous position and/or speed and/or acceleration of the transport unit, whereby a continuous transfer of the transport unit between adjacent transport sections can take place. In other words, the track sections for a transport unit form add up to a track with continuous position and/or speed and/or acceleration of the transport unit.

The segment controllers can transmit operating parameters and/or operating data of the transport unit to the associated section control units, wherein the section control units can transmit the operating parameters and/or operating data to the logistics unit.

Preferably, the section control units determine the track section while maintaining specified maximum values. Target values can also be determined directly by the section control units, which in turn can take place while maintaining specified maximum values. Compliance with maximum values can take place analogously to a centrally planned track, wherein within the scope of the present invention the maximum values are taken into account in relation to track sections instead of a centrally planned track.

The present invention is described in greater detail below with reference to FIGS. 1 to 4, which show schematic and non-limiting advantageous embodiments of the invention by way of example. The following are shown:

Figure 1:
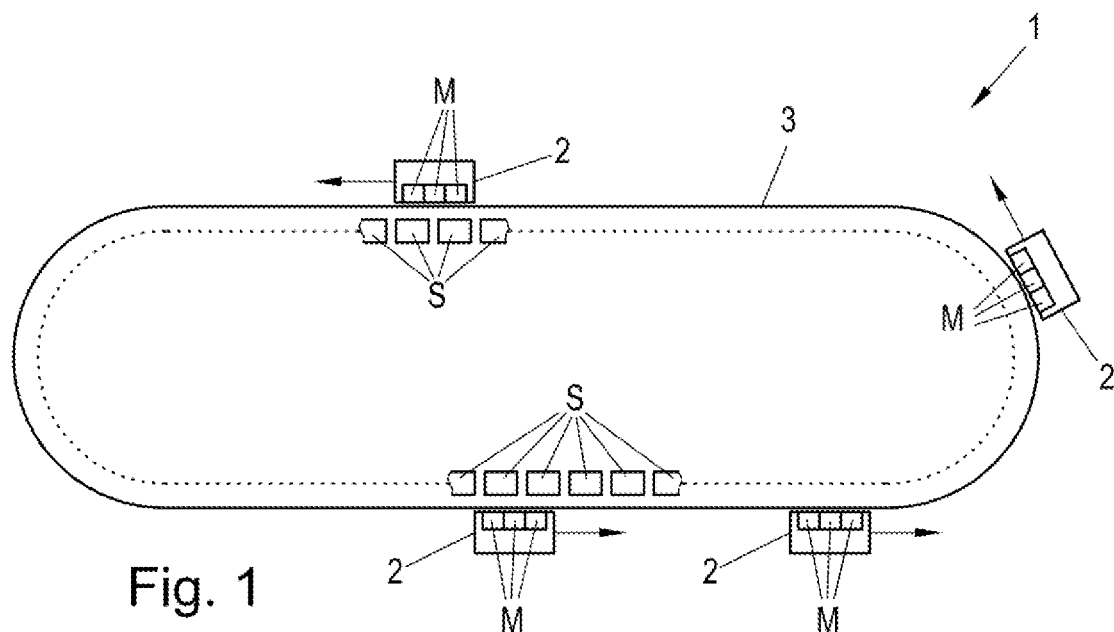
FIG. 1 shows an electromagnetic transport system.

FIG. 1 shows, as an electromagnetic transport system 1, an exemplary long stator linear motor 1 which comprises a very simple transport route 3. Although the transport route 3 here merely represents a closed loop, transport routes 3 branching out in any way are of course also possible. A number of transport units 2 is provided, which are movably arranged along the transport route 3 and are here moved in the clockwise direction only by way of example. Drive coils S are arranged along the transport route 3, whereas drive magnets M are arranged on the transport units 2. By supplying current to the drive coils S, a magnetic field that is movable along the transport route 3 is generated, which interacts with the drive magnets M of the transport units 2 in order to set them in motion along the transport route 3. Depending on the application and requirements, the transport route 3 can be of any shape, and can comprise closed and/or open route sections. The transport route 3 does not have to extend in one plane, but can also be guided in any way in space. Drive coils S can also be arranged bilaterally or multilaterally over at least part of the transport route 3. Similarly, drive magnets M can be arranged bilaterally or multilaterally on the transport units 2. The basic structure and functional principle of a long stator linear motor are sufficiently known, so that no further details are given here.

Likewise, for example, a planar motor can be provided as the electromagnetic transport system 1. In contrast to the long stator linear motor, which has a fundamentally one-dimensional transport route 3, a planar motor has a two-dimensional transport route 3 and can thus also be referred to as the transport plane. The drive coils S are distributed in the two-dimensional transport route 3 in order to generate a magnetic field which can be moved in two dimensions in the transport route 3. The drive magnets M are advantageously also arranged so as to be distributed in a two-dimensional manner on the transport unit 2 in order to interact with the magnetic field and move the transport unit 2 in the transport route 3. The drive coils S and the drive magnets M are advantageously arranged in such a way that, in addition to a one-dimensional movement along the axes spanned by the transport route 3 (y-axis and z-axis in an yz-plane), more complex two-dimensional movements of the transport unit in the transport route 3 are also possible. In principle, it is also possible that only a one-dimensional movement in the two-dimensional transport route 3 is provided. In this case, the drive magnets M and the drive coils S can also be arranged only one-dimensionally. The mode of operation and the structure of planar motors is also known in principle, which is why it will not be discussed in detail here.

The present invention is fundamentally described hereinafter in relation to a one-dimensional transport route 3, but is also valid for other electromagnetic transport systems with two-dimensional transport routes 3, such as planar motors. Also, the electromagnetic transport unit 1 can comprise a first number of transport sections 4 which are one-dimensional, as well as comprise a second number of transport sections 4 which are two-dimensional.

Figure 2:
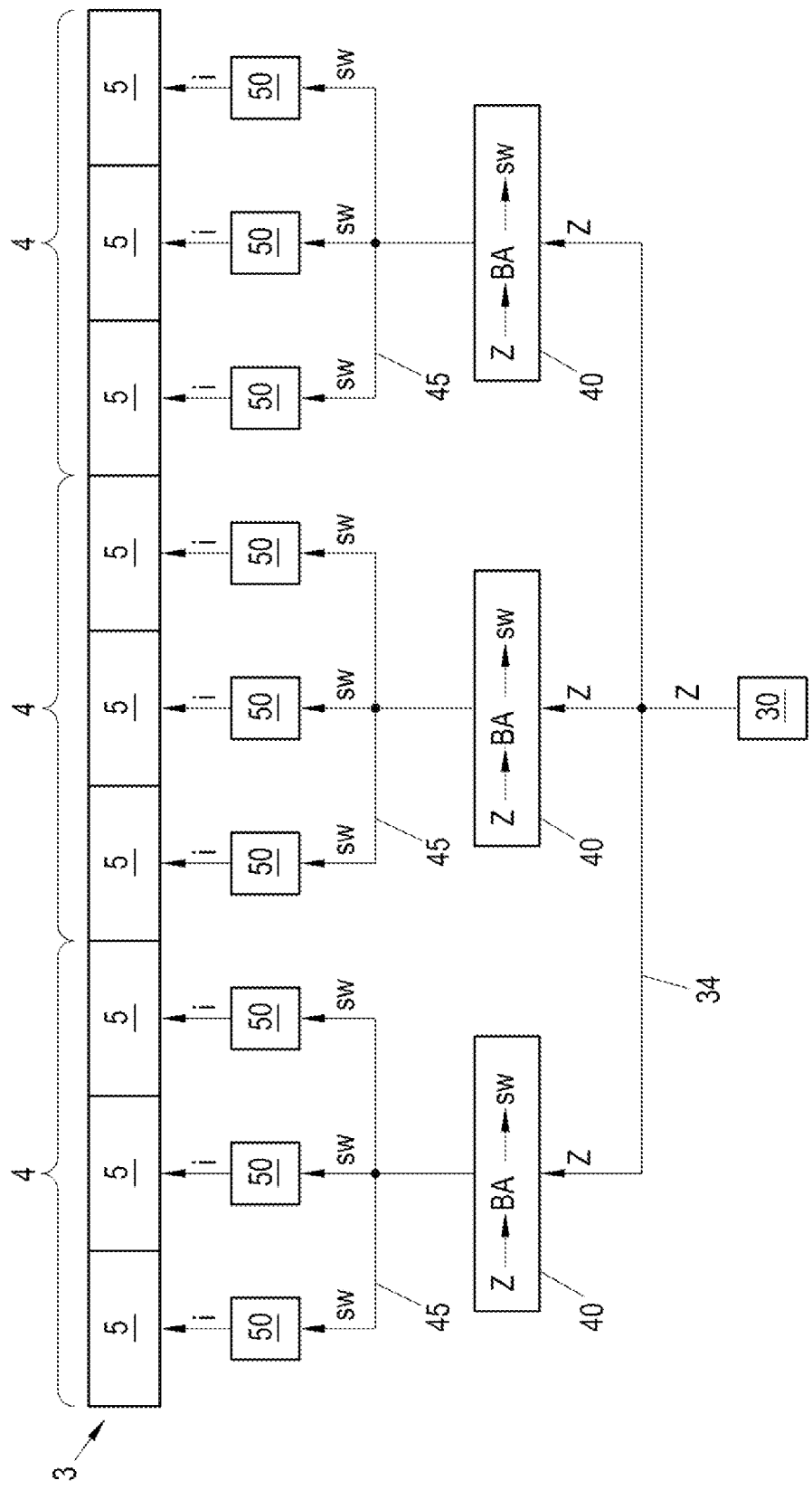
FIG. 2 shows a division of the transport route into transport sections and a division of the transport sections into transport segments.

In FIG. 2 is shown, only for the purpose of simplifying the representation, a planar transport route 3 which is divided into a plurality (here three) of transport sections 4. The transport sections 4 are in turn divided into a number (here three) on transport segments 5, wherein the number of transport segments 5 can vary between the transport sections 4. A transport section 4 can also comprise branched and/or parallel transport segments 5. The transport segments 5 each comprise drive coils S (not shown in FIG. 2 for reasons of clarity), which are supplied with current by a segment controller 50 associated with the transport segment 5 (shown in each case as a coil current i) in order to generate a magnetic field traveling along the transport route 3. Of course, a transport segment 5 can also comprise more than one drive coil S. The actual values iw occurring on the transport segments 5 are known to the segment controller 50. As actual values iw, for example, the actual position and/or the actual speed and/or the actual acceleration of a transport unit 2 located in the associated transport segment 5 and/or actual currents, actual voltages, actual forces etc. occurring in the transport segment can be detected. For this purpose, sensors, e.g., (magnetic) position sensors for determining the actual position, can be provided on the transport segment 5. The segment controllers 50 are given target values sw, whereupon control variables (e.g., the coil current i or the coil voltage of the drive coils S) are predefined in order to adapt the actual values iw to the target values sw.

Likewise, operating data and/or operating parameters such as status information (identification number of the transport unit 2, mileage of the transport unit 2, maintenance data of the transport unit 2, loading state of the transport unit 2, tool number of the transport unit 2, processing sequence, data on a product loaded onto the transport unit 2, etc.) can be known to the segment controller 50.

In accordance with the prior art, a central route planning unit is often provided for the calculation and specification of the total track and thus of target values, said central route planning unit transmitting the target values to all segment controllers 50 in order to produce the desired track.

According to the invention, a section control unit 40 is assigned to each of the transport sections 4. For example, the section control unit 40 can be embodied as a programmable logic controller (PLC) or as a computer. A central logistics unit 30 is provided, which specifies a destination Z of the transport units 2 to the associated section control units 40 via a logistics network 34. In addition, further logistics functions can also be specified by the logistics unit 30 to the section control units 40 via the logistics network 34, e.g., actions to be carried out such as loading activities etc. These logistics functions can also be carried out depending on operating data and/or operating parameters of the respective transport unit.

If the destination Z is accessible via several transport sections 4, the logistics unit 30 can specify to the transport section 4 from which transport section 4 to which transport section 4 the transport unit 2 is transferred. The destination Z of the respective transport units 2 can also be determined depending on the operating parameters/operating data. Thus, a section control unit 40 can decide to which transport section a transport unit 2 is to be transferred, depending on associated operating parameters/operating data, without the logistics unit 30 having to intervene.

The logistics unit 30 controls the movement of the transport units 2 by specifying the destination Z to the section control units 40.

The section control units 40 determine track sections BA of the individual transport units 2, which are located within the associated transport section 4, based on the destination Z specified by the logistics unit 30. The track section BA corresponds to a movement profile and may extend to an adjacent transport section 4. From the adjacent transport section 4, the associated track section BA can be further planned in turn by the associated section control unit 40. Preferably, a continuous transition of the track sections BA between adjacent transport sections 4 can be provided. Based on the track section BA, target values sw for transport units 2 located in the transport section 4 are determined and transmitted via a segment network 45 to the associated segment controllers 50. For example, the target position and/or the target speed and/or the target acceleration for a transport unit 2 located in the associated transport segment 5 and/or target currents, target forces, etc. can be specified as target values sw. By specifying the target values sw in the transport section 4, the associated track section BA can thus be described.

It should be noted here that the individual target values sw in FIG. 2 typically are of course not identical, although they have the same reference sign, but are determined individually by the section control units 40. Of course, despite identical reference signs, the coil currents i are typically also not identical, but rather are dependent on the respective target values sw. However, the destination Z specified by the logistics unit 3 is fundamentally uniform for all section control units 40, wherein it is possible of course to differentiate between destinations Z of individual transport units 2.

Due to the fact that a total track does not have to be determined from the destination Z, but only track sections BA are determined on the basis of the section control units 40, a much lower computing power is required than when the total track is determined. Thus, the determination of the track is fundamentally divided into a determination of track sections BA.

Preferably, the cycle time of the segment network 45 is adjustable and adapted to the size of the transport section 40 in question and the number of subordinate transport segments.

Logistics functions may also be defined by the logistics unit 30 in addition to the destination Z in order to specify further process steps. These logistics functions can be transferred, for example, in the form of configurations to the section control units 40, which then, when calculating the track section BA of the transport units 2, e.g., depending on operating parameters/operating data, can instruct the transport units 2 to carry out the logistics functions.

Figure 3:
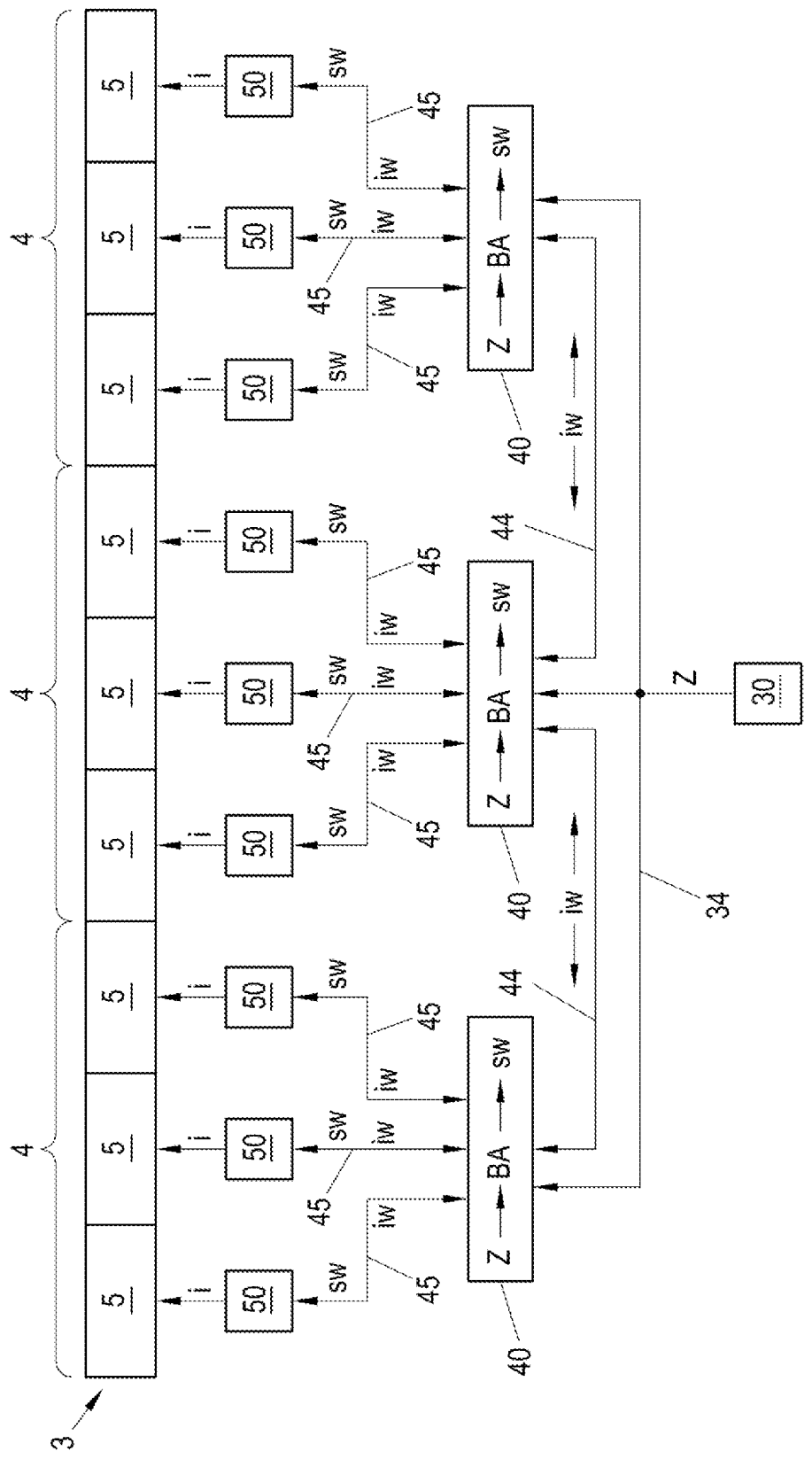
FIG. 3 shows a transmission of actual values from the segment controllers to the section control unit.

As shown in FIG. 3, the section control units 40 can be connected to one another via a section network 44, whereby data can be transferred between the section control units 40. In particular, actual values iw and/or known operating data and/or operating parameters can be transmitted as data via the section network 44, in particular to adjacent section control units 40. For this purpose, it can be provided that, via the segment network 45, actual values iw and/or known operating data and/or operating parameters are transmitted from the segment control units 50 to the superordinate section control units 40. Although in FIG. 3 the section network 44 as well as the segment networks 45 are shown as individual connections, they can of course also be designed as a bus, etc.

Transport units 2 can be moved along the transport route 3, wherein different transport sections 2 can also be passed or reached. Thus, a transfer of the transport unit 2 between transport sections takes place.

In particular, data can be transferred from a section control unit 40 which is associated with a transferring transport section 4 to a section control unit 40 which is associated with a receiving transport section 4 in order to ensure a secure transfer and receipt of the transport unit 2.

Figure 4:
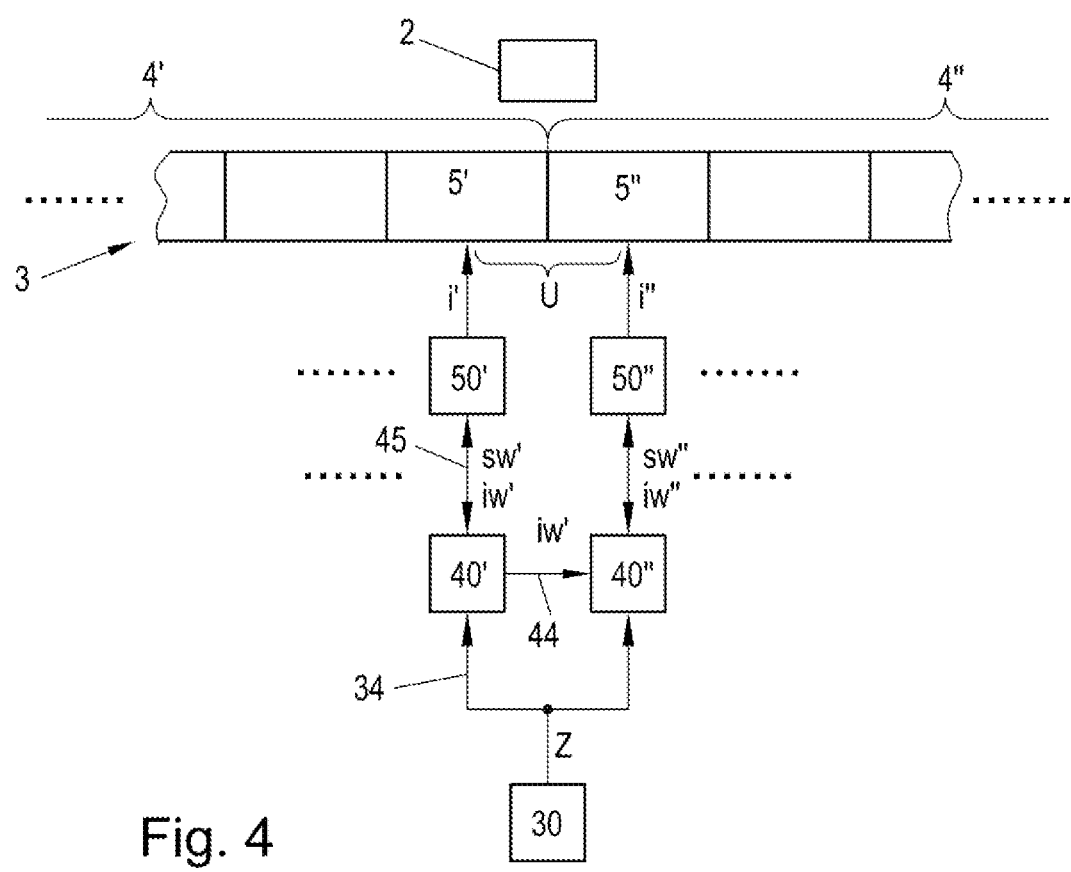
FIG. 4 shows a transfer of actual values from a section control unit to an adjacent section control unit.

In FIG. 4, a transfer of a transport unit 2 from a first transport section 4' to a second transport section 4" is shown, wherein only a first transport segment 5' of the first transport section 4' and a second transport segment 5" of the second transport section 4" are shown. The transport unit 2 is located in a transfer area U which overlaps the first and second transport segments 5'. 5" and thus also the first and second transport sections 4', 4". Associated with the first transport section 4' is a first section control unit 40' which is connected to a first segment controller 50' associated with the first transport segment 5' via a first segment network 45', associated with the second transport section 4" is a second section control unit 40" which is connected to a second segment controller 50" associated to the second transport segment 5" via a second segment network 45".

The transport unit 2 can be controlled in the transfer area U by the segment controllers 50'50" of both transport sections 4', 4" or initially by the first segment controller 50' and subsequently by the second segment controller 50". In both cases, the first section control unit 4' can determine the first target value sw' based on the destination Z and transmit it to the first segment controller 50'. The segment controller 50' provides the transport segment 5, starting from the obtained first target value sw' and a present first actual value iw' (e.g., determined by means of sensors), with a control variable for supplying current to the drive coil(s) of the first transport segment 5'. Here, a first coil current i' is provided as a control variable, but other control variables such as, for example, coil voltages, etc. are also possible). As soon as the transport unit 2 has left the first transport section 4' the calculation of the first target value sw' can be terminated.

It may be provided that an actual value iw and/or operating data/operating parameter are transferred from the first transport section 4' to the second transport section 4". For this purpose, the actual value iw' and/or operating data/ operating parameter are transmitted from the first segment controller 50' via the first segment network 45' to the first section control unit 40' which transmits the actual value iw' to the second section control unit 40" via the section network 44.

If it is provided that only one segment controller 50', 50" at a time controls the transport unit 2 in the transfer area U, the change of the controlling segment controller 50', 50" can be effected by the first segment controller 50' transmitting the first actual value iw' to its section control unit 40' which in turn transmits the first actual value iw' via a section network 44 to the second section control unit 40" which can also transmit said value to the second segment controller 50". Since the first actual value iw' of the second section control unit 40" is known in advance, a rapid transfer of the transport unit 2 to the second transport section 4" can be effected The second section control unit 40" can prepare the second target value sw" in advance for the receipt of the transport unit 2 based on the first actual value iw'. Thus, the second transport controller 50" can prepare the corresponding specification of the second control variable (e.g., the second coil current i") using the second target value sw" in order to adapt the second actual value iw" to the second target value sw", and immediately specify the second control variable upon transfer. Subsequently, the track section BA is calculated by the second section control unit 40" on the basis of the destination, the second target sw" is determined and specified to the second segment controller 50" which further specifies the second control variable in order to adapt the second actual value iw" to the second target value sw".

The actual value iw' can be converted to an actual value iw" that is appropriate for the second transport segment 5", if necessary. This can be done on the first section control unit 40' before the actual transfer of the actual value iw' via the section network 44, or on the second section control unit 40" after the actual value iw' has been received.

After the transfer has taken place, the track section BA in the first section control unit 40' can be deleted, since a track section BA has already been generated in the second section control unit 40". The fact that a transport unit 2 arrives at the second transport section 4" can be communicated to the second section control unit 40" via the logistics network 34 by the logistics unit 30 and/or via the section network 44 by the first section control unit 40'. This allows the second section control unit 40" to prepare for receiving the transport unit 2. In addition, the position and/or speed of the arriving transport unit 2 can be communicated to the second section control unit 40" via the logistics network 34 by the logistics unit 30 and/or via the section network 44 by the first section control unit 40'.

If it is provided in the transfer area U that at least partially both the first segment controller 50' and the second segment controller 50" control the transport unit 2, thus, the second section control unit 40" is of course already aware of the second actual value iw", with which it can directly calculate the second track section BA and from this the target value sw" and transmit said value to the second segment controller 50". If, in addition, the actual value iw' is transferred to the second section control unit 40" via the section network 44 and the actual value iw" of the second segment controller 50" is already available at the second section control unit 4", this can be regarded as redundant Information, with which errors can be detected, for example.

The transport unit 2 can be at a standstill during the transfer. However, the transfer can also take place at any desired speed of the transport unit 2.

If a branching of the transport path 3 (i.e., a switch) is located in the transfer area U, the drive coils S of the drive segments 4 located in the area of the branching also apply forces in the transverse direction in addition to propelling forces in order to repel and/or attract the transport unit 2 in such a way that the branching provided in accordance with the determined track section BA is taken.

The logistics unit 30 and/or the section control units 40 and/or the segment controllers 50 may comprise microprocessor-based hardware, for example a computer or digital signal processor (DSP), on which corresponding software is executed to perform the respective function. The logistics unit 30 and/or section control units 40 and/or segment controllers 50 may also comprise an integrated circuit, for example an application-specific integrated circuit (ASIC) or a field-programmable gate array (FPGA), also with a microprocessor. The logistics unit 30 and/or section control units 40 and/or segment controllers 50 may also comprise an analog circuit or analog computer. Mixed forms are conceivable as well. Likewise, it is possible that different functions are implemented on the same hardware.

The invention claimed is:

1. An electromagnetic transport system comprising a number of transport units which are movably arranged along a transport route, wherein drive coils are arranged along the transport route and drive magnets are arranged on the transport units, wherein the transport route is divided into transport sections and the transport sections each comprise at least one transport segment, with each of the transport sections being assigned a section control unit and with each transport segment being assigned a segment controller, wherein a logistics unit is provided, which is connected to the section control units via a logistics network, and is designed to specify a destination of the number of transport units to the section control units via the logistics network, wherein the section control units of the transport sections are connected to the segment controllers of the associated transport segments via a segment network and are designed to:

determine a track section for the transport units located in the associated transport section from the destination for the associated transport section, wherein the track section describes a general route from a current location of the transport units to a transfer position between adjacent transport sections, if the destination is outside the transport section, or describes the destination, if the destination is inside the transport section, to determine target values for the transport units located in the associated transport section using the track section, and transmit said the target values to the associated segment controllers via the segment network, and wherein the segment controllers are designed to supply current to the drive coils using the target values and occurring actual values in order to generate a magnetic field which interacts with drive magnets of the transport units in order to move the number of transport units.

2. The electromagnetic transport system according to claim 1, wherein sensors are provided on the transport segments in order to detect the actual values.

3. The electromagnetic transport system according to claim 1, wherein the actual values comprise actual currents and/or actual forces and/or actual positions and/or actual speeds and/or actual accelerations and wherein the target values comprise target currents and/or target forces and/or target positions and/or target speeds and/or target accelerations.

4. The electromagnetic transport system according to claim 1, wherein the section control units are connected to one another via a section network and are designed to transmit data, preferably actual values, via the section network.

5. The electromagnetic transport system according to claim 4, wherein the section network represents a real-time network or a point-to-point network, preferably with an adjustable cycle time.

6. The electromagnetic transport system according to claim 1, wherein the segment network represents a real-time network, preferably with an adjustable cycle time.

7. The electromagnetic transport system according to claim 1, wherein the logistics network is a non-real time-capable network, preferably an Ethernet network.

8. The electromagnetic transport system according to claim 1, wherein adjacent transport segments are designed to overlap.

9. The electromagnetic transport system according to claim 1, wherein the transport sections are each designed two-dimensionally and/or one-dimensionally.

10. A method for controlling the movement of a number of transport units which are arranged movably along a transport route of an electromagnetic transport system, wherein the transport route is divided into transport sections and the transport sections each comprise at least one transport segment, wherein the section control units associated with the transport sections are each assigned a destination of the number of transport units is provided to each of the section control units, which are assigned to the transport sections by a logistics unit via a logistics network, wherein the section control units for the number of transport units:

determine a track section for the transport units located in the assigned transport section in each case from the associated destination, wherein the track section describes a general route from a current location of the respective transport unit to a transfer position between adjacent transport sections, if the destination is outside the transport section, or describes the destination, if the destination is inside the transport section, determine target values for the transport units located in the associated transport section from the track sections and transmit them via a segment network to segment controllers of the associated segments, and wherein the segment controllers supply current to drive coils of the transport segment using the target values and known actual values in order to generate a magnetic field which interacts with drive magnets of the transport units in order to move the number of transport units.

11. The method according to claim 10, wherein the section control units exchange data via a section network.

12. The method according to claim 11, wherein segment controllers transmit actual values to the section control units via the segment network, and wherein the section control units transmit actual values via a section network.

13. The method according to claim 10, wherein track sections of adjacent transport sections have a continuous position and/or speed and/or acceleration of the transport unit.

14. The method according to claim 10, wherein the segment controllers transmit operating parameters and/or operating data to the associated section control units.

15. The method according to claim 14, wherein the section control units transmit the operating parameters and/or operating data to the logistics unit.

16. The method according to claim 10, wherein the section control units determine the target values while maintaining specified maximum values.

\* \* \* \* \*